US012597581B2

(12) United States Patent
Suzuki et al.

(10) Patent No.: US 12,597,581 B2
(45) Date of Patent: Apr. 7, 2026

(54) X-RAY GENERATION DEVICE

(71) Applicant: HAMAMATSU PHOTONICS K.K., Hamamatsu (JP)

(72) Inventors: Naonobu Suzuki, Hamamatsu (JP); Atsushi Ishii, Hamamatsu (JP); Ryosuke Yabushita, Hamamatsu (JP); Akimichi Shimizu, Hamamatsu (JP); Naofumi Kosugi, Hamamatsu (JP); Ginji Sugiura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 194 days.

(21) Appl. No.: 18/568,468

(22) PCT Filed: Feb. 14, 2022

(86) PCT No.: PCT/JP2022/005732

§ 371 (c)(1),
(2) Date: Dec. 8, 2023

(87) PCT Pub. No.: WO2023/276243

PCT Pub. Date: Jan. 5, 2023

(65) Prior Publication Data

US 2024/0274393 A1 Aug. 15, 2024

(30) Foreign Application Priority Data

Jun. 30, 2021 (JP) ................................ 2021-108668

(51) Int. Cl.

| | |
|---|---|
| ***H01J 35/14*** | (2006.01) |
| ***H01J 35/08*** | (2006.01) |
| ***H01J 35/16*** | (2006.01) |
| ***H01J 35/18*** | (2006.01) |
| ***H01J 35/30*** | (2006.01) |

(52) U.S. Cl.
CPC ............ *H01J 35/153* (2019.05); *H01J 35/08* (2013.01); *H01J 35/116* (2019.05); *H01J 35/14* (2013.01);
(Continued)

(58) Field of Classification Search
CPC .......... H01J 35/08; H01J 35/116; H01J 35/14; H01J 35/147; H01J 35/153; H01J 35/16;
(Continued)

(56) References Cited

U.S. PATENT DOCUMENTS

| | | | |
|---|---|---|---|
| 5,105,456 | A | 4/1992 | Rand et al. |
| 2008/0084966 | A1 | 4/2008 | Aoki et al. |

(Continued)

FOREIGN PATENT DOCUMENTS

| | | |
|---|---|---|
| JP | S48-055687 A | 8/1973 |
| JP | H6-124671 A | 5/1994 |

(Continued)

OTHER PUBLICATIONS

Translation of JP 2001126650 A (Year: 2001).*
International Preliminary Report on Patentability mailed Jan. 11, 2024 for PCT/JP2022/005732.

*Primary Examiner* — Mark R Gaworecki
(74) *Attorney, Agent, or Firm* — Faegre Drinker Biddle & Reath LLP

(57) ABSTRACT

An X-ray generation device includes: a housing; an electron gun including an electron-emitting unit that emits an electron inside the housing; a target that generates an X-ray upon an incidence of the electron inside the housing; a window member that seals an opening of the housing and that transmits the X-ray; a tube voltage application unit that applies a tube voltage between the electron-emitting unit and the target; and a magnetic field-forming unit for deflecting the electron by forming a magnetic field between the elec-
(Continued)

tron-emitting unit and the target. A thickness of the target has a distribution, and the target is disposed such that the electron is incident on a portion of the target which is relatively thinner in the thickness when the tube voltage is relatively low than when the tube voltage is relatively high.

4 Claims, 6 Drawing Sheets

(52) U.S. Cl.
CPC .............. *H01J 35/16* (2013.01); *H01J 35/18* (2013.01); *H01J 35/186* (2019.05); *H01J 35/30* (2013.01); *H01J 35/147* (2019.05); *H01J 2235/086* (2013.01)

(58) Field of Classification Search
CPC .......... H01J 35/18; H01J 35/186; H01J 35/30; H01J 2235/086
See application file for complete search history.

(56) References Cited

U.S. PATENT DOCUMENTS

| | | | | |
|---|---|---|---|---|
| 2011/0142204 | A1* | 6/2011 | Zou | H01J 35/065<br>378/138 |
| 2011/0150184 | A1 | 6/2011 | Kozaczek et al. | |
| 2017/0338077 | A1* | 11/2017 | Tsujino | H01J 35/153 |

FOREIGN PATENT DOCUMENTS

| | | | | |
|---|---|---|---|---|
| JP | 2001126650 | A | * | 5/2001 |
| JP | 2007-207548 | A | | 8/2007 |
| JP | 2008-016339 | A | | 1/2008 |
| JP | WO-2016-125289 | | | 1/2018 |
| JP | 6695011 | B1 | | 5/2020 |
| TW | 202038281 | A | | 10/2020 |
| WO | 2013/065762 | A1 | | 5/2013 |
| WO | WO-2016/125289 | A1 | | 8/2016 |
| WO | WO-2020/084664 | A1 | | 4/2020 |

* cited by examiner (a)

(b)

(c)

X-RAY GENERATION DEVICE

TECHNICAL FIELD

The present disclosure relates to an X-ray generation device.

BACKGROUND ART

Patent Literature 1 describes a transmission type X-ray tube device. The device includes a vacuum envelope constituting an X-ray tube; an X-ray transmissive window provided at one end portion of the vacuum envelope; a metal thin film forming an X-ray target provided on a vacuum side of the X-ray transmissive window; and an electron gun that generates an electron beam with which the X-ray target is irradiated.

CITATION LIST

Patent Literature

Patent Literature 1: Japanese Unexamined Patent Publication No. 2001-126650

SUMMARY OF INVENTION

Technical Problem

In the device described in Patent Literature 1, the film thickness of the metal thin film differs depending on the location, and a deflection electrode that deflects the electron beam is provided. The deflection electrode includes a pair of electrode plates that are disposed between the target and a focusing electrode so as to face each other. Accordingly, in the device, the electron beam is incident at an appropriate film thickness location on the target by changing a deflection voltage applied to the deflection electrode according to a change in the acceleration voltage of the electron beam generated from the electron gun.

In such a manner, in the above technical field, there is a requirement that the electron beam is incident at an appropriate thickness position on the target according to the acceleration voltage of the electron beam. However, in the device described in Patent Literature 1, in order to meet the requirement, in addition to controlling the acceleration voltage of the electron beam, it is also necessary to adjust the deflection voltage so as to correspond to the acceleration voltage, so that the overall control becomes complicated.

Therefore, an object of the present disclosure is to provide an X-ray generation device that enables an electron beam to be incident at an appropriate position on a target while avoiding the complication of control.

Solution to Problem

According to the present disclosure, there is provided an X-ray generation device including: a housing; an electron gun including an electron-emitting unit configured to emit an electron inside the housing; a target configured to generate an X-ray upon an incidence of the electron inside the housing; a window member sealing an opening of the housing and configured to transmit the X-ray; a tube voltage application unit configured to apply a tube voltage between the electron-emitting unit and the target; and a magnetic field-forming unit configured to deflect the electron by forming a magnetic field between the electron-emitting unit and the target. A thickness of the target has a distribution, and the target is disposed such that the electron is incident on a portion of the target which is relatively thinner in the thickness when the tube voltage is relatively low than when the tube voltage is relatively high.

In the device, the tube voltage is applied between the electron-emitting unit of the electron gun and the target by the tube voltage application unit, and the magnetic field is formed between the electron-emitting unit and the target by the magnetic field-forming unit. Therefore, even in a case where the magnetic field formed by the magnetic field-forming unit is constant (for example, with respect to time), when the speed of the electron is changed by changing the acceleration of the electron through adjusting the tube voltage to a desired value, the radius of the circular motion of the electron caused by a Lorentz force changes. For this reason, the deflection amount of the electron caused by the magnetic field also changes automatically. For example, when the tube voltage is relatively high and the electron moves at a high speed, the radius of the circular motion of the electron caused by a Lorentz force becomes large, and as a result, the deflection amount of the electron becomes small. On the other hands, when the tube voltage is relatively low and the electron moves at a low speed, the radius of the circular motion of the electron caused by a Lorentz force becomes small, and as a result, the deflection amount of the electron becomes large. In such a manner, in the device, the deflection amount of the electron is also automatically adjusted to correspond to the desired tube voltage without controlling the formation (size) of the magnetic field by the magnetic field generation unit. Therefore, the target having a thickness distribution is disposed such that the electron is incident on a relatively thinner portion of the target when the tube voltage is relatively low than when the tube voltage is relatively high, so that the electron can be incident at an appropriate position on the target while avoiding the complication of control (automatically).

In the X-ray generation device according to the present disclosure, the thickness of the target may be set to become thinner from a central portion toward a peripheral edge portion of the target, and the target may be disposed such that the electron is incident on a peripheral edge portion side as the tube voltage becomes relatively lower. In this case, it becomes easy to form the target such that the thickness of the target has the above-described distribution.

In the X-ray generation device according to the present disclosure, the magnetic field-forming unit may include a permanent magnet. In such a manner, in the device, a constant magnetic field may be formed by the permanent magnet, and the complication of control is reliably avoided.

In the X-ray generation device according to the present disclosure, the window member may have a first surface opposite to an interior of the housing, and a second surface on an interior side of the housing, and the target may be formed on the second surface. In this case, the so-called transmission type X-ray generation device is configured.

In the X-ray generation device according to the present disclosure, the target may be supported in a state where the target is inclined to face both the electron gun and the window member. In this case, the so-called reflection type X-ray generation device is configured.

Advantageous Effects of Invention

According to the present disclosure, it is possible to provide the X-ray generation device that enables the electron beam to be incident at an appropriate position on the target, while avoiding the complication of control.

DESCRIPTION OF EMBODIMENTS

Figure 1:
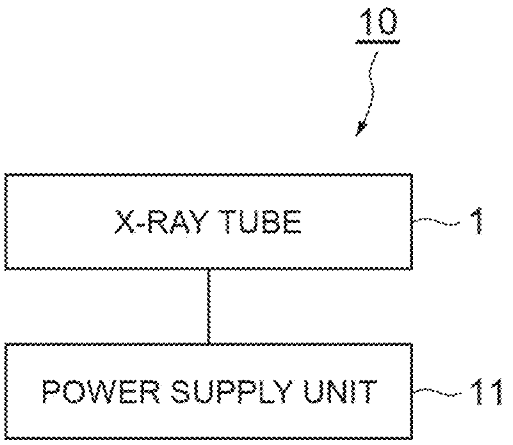
FIG. 1 is a block diagram of an X-ray generation device of one embodiment.

Hereinafter, one embodiment will be described in detail with reference to the drawings. Incidentally, in the drawings, the same or corresponding portions are denoted by the same reference signs, and duplicate descriptions will be omitted.

[Configuration of X-Ray Generation Device]

As illustrated in FIG. 1, an X-ray generation device 10 includes an X-ray tube 1 and a power supply unit 11. The X-ray tube 1 and the power supply unit 11 are supported inside a casing (not illustrated) made of metal. As one example, the X-ray tube 1 is a small-focus X-ray source, and the X-ray generation device 10 is a device used for X-ray nondestructive inspection for magnifying and observing an internal structure of an inspection target.

Figure 2:
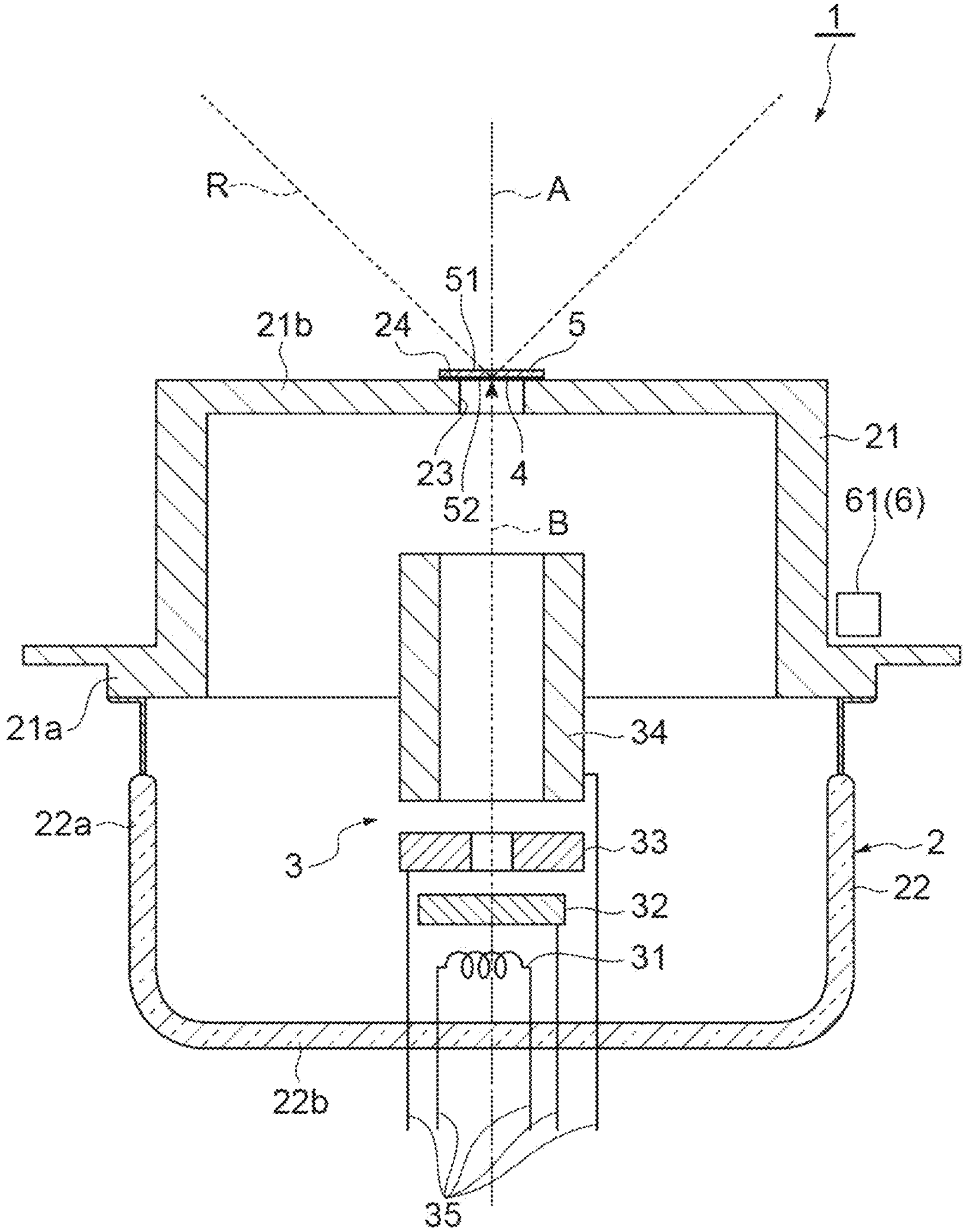
FIG. 2 is a cross-sectional view of an X-ray tube illustrated in FIG. 1.

As illustrated in FIG. 2, the X-ray tube 1 includes a housing 2, an electron gun 3, a target 4, and a window member 5. As described below, the X-ray tube 1 is configured as a sealed transmission type X-ray tube that does not require component replacement and the like.

The housing 2 includes a head 21 and a valve 22. The head 21 is formed in a bottomed tubular shape from metal. The valve 22 is formed in a bottomed tubular shape from an insulating material such as glass. An opening portion 22*a* of the valve 22 is joined to an opening portion 21*a* of the head 21 in an airtight manner. In the X-ray tube 1, a center line of the housing 2 is a tube axis A. An opening 23 is formed in a bottom wall portion 21*b* of the head 21. The opening 23 is located on the tube axis A. The opening 23 has, for example, a circular shape with the tube axis A as a center line when viewed in a direction parallel to the tube axis A.

The electron gun 3 emits an electron beam B inside the housing 2. The electron gun 3 includes a heater 31, a cathode 32, a first grid electrode 33, and a second grid electrode 34. The heater 31, the cathode 32, the first grid electrode 33, and the second grid electrode 34 are disposed on the tube axis A in order from a bottom wall portion 22*b* side of the valve 22. As one example, an axis A3 (refer to FIG. 4) of the electron gun 3 coincides with the tube axis A. Incidentally, for example, the axis A3 of the electron gun 3 may be defined as a central axis of the electron gun 3 (for example, a central axis of the cathode 32, the first grid electrode 33, and the second grid electrode 34), or may be defined as the trajectory of the electron beam B when the electron beam B is not deflected as will be described later. The heater 31 is composed of a filament, and generates heat when energized. The cathode 32 is heated by the heater 31 to release electrons. Namely, the cathode 32 is an electron-emitting unit that emits the electrons inside the housing 2.

The first grid electrode 33 is formed in a tubular shape, and adjusts the amount of the electrons released from the cathode 32. In addition, the first grid electrode 33 is also an extraction electrode for extracting the electrons emitted from the cathode 32. The initial speed of the electrons is defined according to a voltage (extraction voltage) applied to the first grid electrode 33. The second grid electrode 34 is formed in a tubular shape, and focuses the electrons, which have passed through the first grid electrode 33, onto the target 4. The heater 31, the cathode 32, the first grid electrode 33, and the second grid electrode 34 are electrically and physically connected to a plurality of respective lead pins 35 penetrating through the bottom wall portion 22*b* of the valve 22. Each of the lead pins 35 is electrically connected to the power supply unit 11 of the X-ray generation device 10.

The window member 5 seals the opening 23 of the housing 2. The window member 5 is formed in a plate shape from a highly X-ray transmissive material, for example, diamond, beryllium, or the like. The window member 5 has, for example, a disk shape with the tube axis A as a center line. The window member 5 has a first surface 51 and a second surface 52. The first surface 51 is a surface opposite to an interior of the housing 2, and the second surface 52 is a surface on an interior side of the housing 2. Each of the first surface 51 and the second surface 52 is, for example, a flat surface perpendicular to the tube axis A. The target 4 is formed on the second surface 52 of the window member 5. The target 4 is, for example, formed in a film shape from tungsten. The target 4 generates an X-ray R upon the incidence of the electron beam B inside the housing 2. In the present embodiment, the X-ray R generated in the target 4 is emitted to the outside by transmitting through the target 4 and the window member 5.

The window member 5 is attached to an attachment surface 24 around the opening 23 of the housing 2. The attachment surface 24 is, for example, a flat surface perpendicular to the tube axis A, and is formed on the head 21. The window member 5 can be joined to the attachment surface 24 using a joining member (not illustrated) such as a brazing material in an airtight manner. In the X-ray tube 1, the target 4 is electrically connected to the head 21, and the target 4 and the window member 5 are thermally connected to the head 21. As one example, the target 4 is set to a ground potential via the head 21. Accordingly, a tube voltage is applied between the cathode 32 of the electron gun 3 and the target 4.

The tube voltage defines the acceleration of the electrons emitted from the cathode 32 toward the target 4. In the X-ray generation device 10, the power supply unit 11 supplies a negative voltage to the cathode 32 via the lead pin 35, and the target 4 (anode) is set to the ground potential, so that the tube voltage is applied between the cathode 32 and the target 4. In such a manner, the power supply unit 11 constitutes a tube voltage application unit that applies the tube voltage, in cooperation with the cathode 32 and the target 4. On the other hand, the power supply unit 11 is also connected to the first grid electrode 33 as an extraction electrode, and applies an extraction voltage to the first grid electrode 33. Therefore, the power supply unit 11 constitutes an extraction voltage application unit. Incidentally, as one example, heat generated in the target 4 upon the incidence of the electron beam B is transferred to the head 21 directly or via the window member 5, and then is released from the head 21 to a heat radiation unit (not illustrated). In the present embodiment, an inner space of the housing 2 is maintained at a high degree of vacuum by the housing 2, the target 4, and the window member 5.

In the X-ray generation device 10 configured as described above, a negative voltage is applied to the electron gun 3 by the power supply unit 11 with reference to the potential of the target 4. As one example, the power supply unit 11 applies a negative high voltage (for example, −10 kV to −500 kV) to each part of the electron gun 3 via each of the lead pins 35 in a state where the target 4 is set to the ground potential. The electron beam B emitted from the electron gun 3 is focused onto the target 4 along the tube axis A. The X-ray R generated in an irradiation region of the electron beam B on the target 4 is emitted to the outside by transmitting through the target 4 and the window member 5 with the irradiation region serving as the focal point.

Here, the X-ray tube 1 includes a deflection unit 6. The deflection unit 6 includes a permanent magnet 61. The permanent magnet 61 is composed of, for example, a ferrite magnet, a neodymium magnet, a samarium cobalt magnet, an alnico magnet, or the like.

The permanent magnet 61 is disposed outside the housing 2, and for example, is fixed to a flange portion of the head 21 using a fixation portion (not illustrated). Accordingly, the permanent magnet 61 is attached to the outside of the housing 2. Particularly, the permanent magnet 61 is disposed between the cathode 32 and the target 4 when viewed in a direction intersecting the tube axis A. As a result, a magnetic field including at least a component perpendicular to a traveling direction of the electrons is formed between the cathode 32 and the target 4. In such a manner, the permanent magnet 61 functions as a magnetic field-forming unit for deflecting the electrons by forming a magnetic field between the cathode 32 and the target 4.

The deflection unit 6 deflects the electron beam B using the magnetic field formed by the permanent magnet 61, to change the incident position of the electron beam B on the target 4. When viewed in a direction perpendicular to a path along which the electron beam B emitted from the cathode 32 travels to the target 4 (radial direction), the deflection unit 6 can include a portion overlapping the path. Accordingly, a force from the magnetic field formed by the permanent magnet 61 can suitably act on the electron beam B. In this example, when viewed in the radial direction, the entirety of the deflection unit 6 is disposed to be included the path of the electron beam B. Incidentally, the deflection unit 6 is not limited to being disposed to include a portion overlapping the path of the electron beam B when viewed in the radial direction, as long as the deflection unit 6 can form a magnetic field that deflects the electron beam B. For example, in FIG. 2, when an emission direction of the X-ray R is referred to as an upper side and the opposite side is referred to as a lower side in a direction along the tube axis A, the deflection unit 6 may be disposed closer to the lower side than the bottom wall portion 22*b* of the valve 22. The deflection unit 6 may be rotatable around the tube axis A. In this case, the position of the incident position of the electron beam B on the target 4 can be adjusted by rotating the deflection unit 6.

[Configuration of Target]

Figure 3:
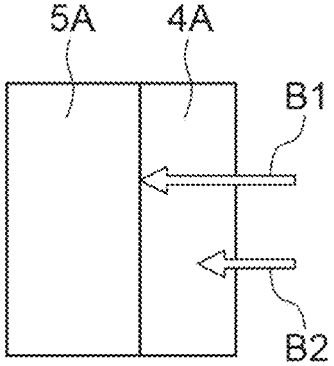
FIG. 3 is a schematic view for describing a relationship between an electron beam and a target.
Figure 3:
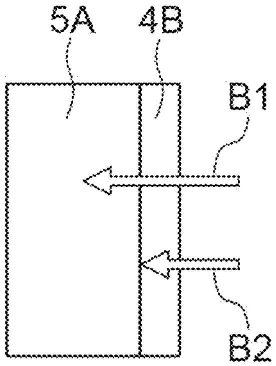
Figure 3:
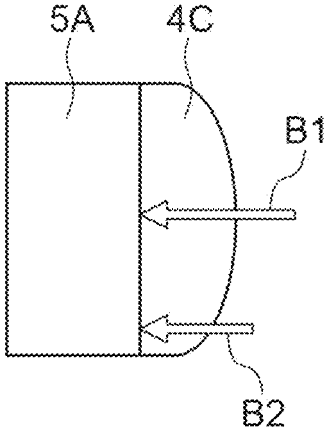

Subsequently, a relationship between the electron beam and the target in the description of a configuration of the target will be described. In the X-ray generation device, since the energy of the generated X-ray differs depending on the tube voltage, the tube voltage may be changed, for example, within a range of 40 kV to 130 kV. As illustrated in FIG. 3, a penetration depth of an electron beam B1 into a target 4A is deeper when the electron beam B1 is accelerated with a relatively high tube voltage than that of an electron beam B2 when the electron beam B2 is accelerated with a relatively low tube voltage.

Therefore, as illustrated in FIG. 3(*a*), when the target 4A is relatively thick, the electron beam B1 when a high tube voltage is applied penetrates the target 4A to reach the vicinity of a boundary (deepest portion of the target 4A) between the target 4A and a support body 5A (here, corresponding to the window member 5). Namely, the penetration depth is appropriate for the thickness of the target 4A. Namely, since the thickness of the target 4A through which the X-ray generated in the target 4A needs to pass until reaching the support body 5A is small, a decrease in X-ray output due to self-absorption by the target 4A is suppressed. On the other hand, since the penetration depth of the electron beam B2 when a low tube voltage is applied stays in the vicinity of the surface of the target 4A, and the thickness of the target 4A through which the X-ray generated in the target 4A needs to pass until reaching the support body 5A is large, the X-ray output decreases due to self-absorption by the target 4A, which is a risk.

Further, since a majority of the energy of the electron beam B is converted into heat, when heat is accumulated in the target 4A, the target 4A is thermally damaged, which is a risk. For this reason, similarly to the electron beam B1, by causing the electron beam to penetrate the target 4A so as to reach the vicinity of the boundary between the target 4A and the support body 5A, generated heat is easily transferred to the support body 5A, so that thermal damage to the target 4A can be suppressed. On the other hand, since the penetration depth of the electron beam B2 when a low tube voltage is applied stays in the vicinity of the surface of the target 4A, the transfer of generated heat to the support body 5A becomes difficult, so that the target 4A is thermally damaged, which is a risk. In such a manner, it can be said that the case of the target 4A being relatively thick is preferable for the electron beam B1 when a high tube voltage is applied, but not preferable for the electron beam B2 when a low tube voltage is applied. Incidentally, in order to efficiently release heat generated inside the target 4A, the support body 5A can be made of a material with good thermal conductivity, for example, diamond.

In addition, as illustrated in FIG. 3(*b*), when a target 4B is relatively thin, the electron beam B2 when a low tube voltage is applied also penetrates the target 4B to reach the vicinity of a boundary (deepest portion of the target 4A) between the target 4B and the support body 5A. Namely, the penetration depth is appropriate for the thickness of the target 4B. On the other hand, since the electron beam B1 when a high tube voltage is applied penetrates through the target 4B, the X-ray output decreases compared to the case of FIG. 3(*a*).

In contrast, as illustrated in FIG. 3(*c*), it can be considered that the thickness of a target 4C is formed to be non-uniform. Namely, it can be considered that a distribution is generated in the thickness of the target 4C. Accordingly, when the electron beam B1 when a high tube voltage is applied is incident on a position where the target 4C is relatively thick, and the electron beam B2 when a low tube voltage is applied is incident on a position where the target 4C is relatively thin, both electron beams can penetrate the target 4C to reach the vicinity of a boundary between the target 4C and the support body 5A. Therefore, a decrease in X-ray output over a wide range of tube voltages can be suppressed, and thermal damage to the target 4C can be suppressed.

Figure 4:
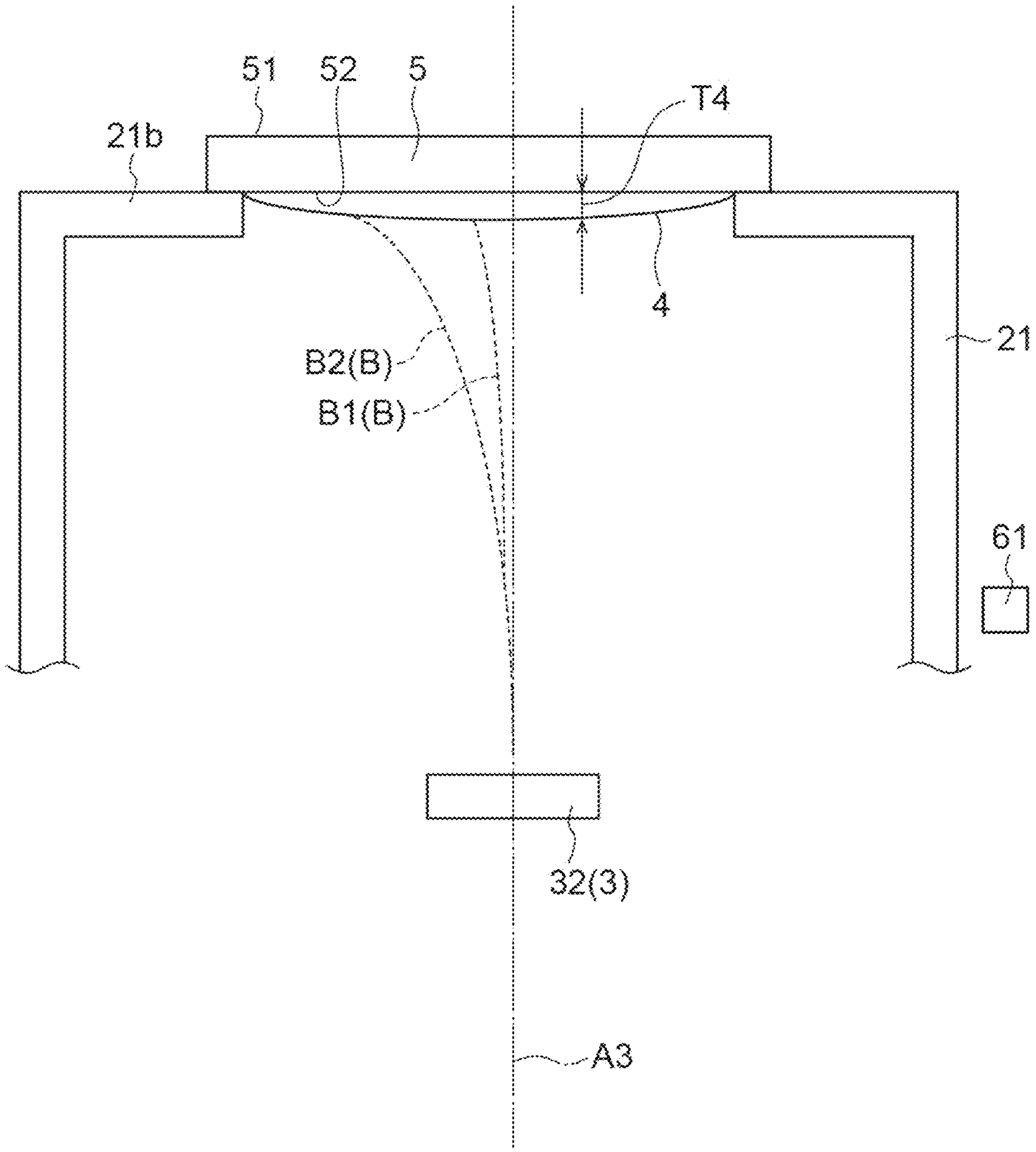
FIG. 4 is a schematic side view illustrating a part of FIG. 2 in an enlarged manner.

Therefore, as illustrated in FIG. 4, in the X-ray generation device 10, a thickness T4 of the target 4 is formed with a predetermined distribution. Namely, the thickness T4 of the target 4 has a distribution in which the thickness T4 changes according to the position in a plane intersecting the axis A3 (tube axis A) that is a center line of the electron gun 3. The distribution mode is any distribution mode; however, in the illustrated example, the thickness T4 of the target 4 is set to become thinner from a central portion 4*a* toward a peripheral edge portion 4*b* when viewed in the direction intersecting the axis A3.

Furthermore, in the X-ray generation device 10, the target 4 is disposed such that the relationship with the incident positions of the electron beams B1 and B2 is appropriate. Namely, the target 4 is disposed such that the electron beam B1 when a high tube voltage is applied is incident on a relatively thick portion of the target 4 and the electron beam B2 when a low tube voltage is applied is incident on a relatively thick portion of the target 4. In other words, in the X-ray generation device 10, the target 4 is disposed such that the electrons (electron beam B) are incident on a portion of the target 4 which is relatively thinner in the thickness when the tube voltage is relatively low than when the tube voltage is relatively high. Incidentally, in FIG. 4, the illustration of parts including the first grid electrode 33 and the second grid electrode 34 of the electron gun 3 is omitted.

The target 4 having a thickness distribution as described above can be manufactured, for example, as follows. Namely, when the target 4 is formed on a support body (here, the window member 5) by film formation, a mask corresponding to the peripheral edge portion of the target 4 is used. Since a portion of the support body which overlaps the mask is poorly visible when viewed from an evaporation source, the film formation is obstructed, so that the film is formed thinner at the portion than at the central portion not overlapping the mask. Accordingly, the target 4 in which the central portion is thick and the peripheral edge portion is thin can be manufactured. A difference in thickness (aspect ratio) between the central portion and the peripheral edge portion can be controlled by adjusting the position where the mask is placed, the plate thickness of the mask, or the like.

[Actions and Effects]

In the X-ray generation device 10, the tube voltage is applied between the cathode 32 of the electron gun 3 and the target 4 by the tube voltage application unit (power supply unit 11), and a magnetic field is formed between the cathode 32 and the target 4 by the permanent magnet 61 of the deflection unit 6. Therefore, when the speed of the electrons is changed by changing the acceleration of the electrons through adjusting the tube voltage to a desired value, the radius of the circular motion of the electrons caused by a Lorentz force changes, and the deflection amount of the electrons caused by the magnetic field also changes automatically.

For example, when the tube voltage is relatively high and the electrons move at high speeds, the radius of the circular motion of the electrons caused by a Lorentz force becomes large, and as a result, the deflection amount of the electrons becomes small. On the other hands, when the tube voltage is relatively low and the electrons move at low speeds, the radius of the circular motion of the electrons caused by a Lorentz force becomes small, and as a result, the deflection amount of the electrons becomes large. In such a manner, in the X-ray generation device 10, the deflection amount of the electrons is also automatically adjusted to correspond to the desired tube voltage without controlling the formation (size) of the magnetic field by the permanent magnet 61. Therefore, the target 4 having a thickness distribution is disposed such that the electrons are incident on a portion of the target which is relatively thinner in the thickness when the tube voltage is relatively low than when the tube voltage is relatively high, so that the electrons can be incident at an appropriate position on the target 4 while avoiding the complication of control (automatically).

Incidentally, one example of the optimum value of the thickness T4 of the target 4 at the incident position of the electrons is approximately 2 μm when the tube voltage is approximately 40 kV, and is approximately 10 μm when the tube voltage is approximately 130 kV. Therefore, the target 4 can be formed such that the thickness T4 is distributed within a range of 2 μm to 10 μm.

In addition, in the X-ray generation device 10, the thickness T4 of the target 4 is set to become thinner from the central portion 4*a* toward the peripheral edge portion 4*b*, and the target 4 is disposed such that the electrons are incident on a peripheral edge portion 4*b* side as the tube voltage becomes relatively lower. For this reason, it becomes easy to form the target 4 such that the thickness T4 of the target 4 has the above-described distribution.

In addition, the X-ray generation device 10 includes the permanent magnet 61 attached to the housing 2 between the cathode 32 and the target 4, as a magnetic field-forming unit. For this reason, in the X-ray generation device 10, a constant magnetic field may be formed by the permanent magnet 61, and the complication of control is reliably avoided.

In addition, in the X-ray generation device 10, the window member 5 has the first surface 51 opposite to the interior of the housing 2, and the second surface 52 on the interior side of the housing 2, and the target 4 is formed on the second surface 52. Accordingly, the so-called transmission type X-ray generation device 10 is configured.

[Modification Example]

Figure 5:
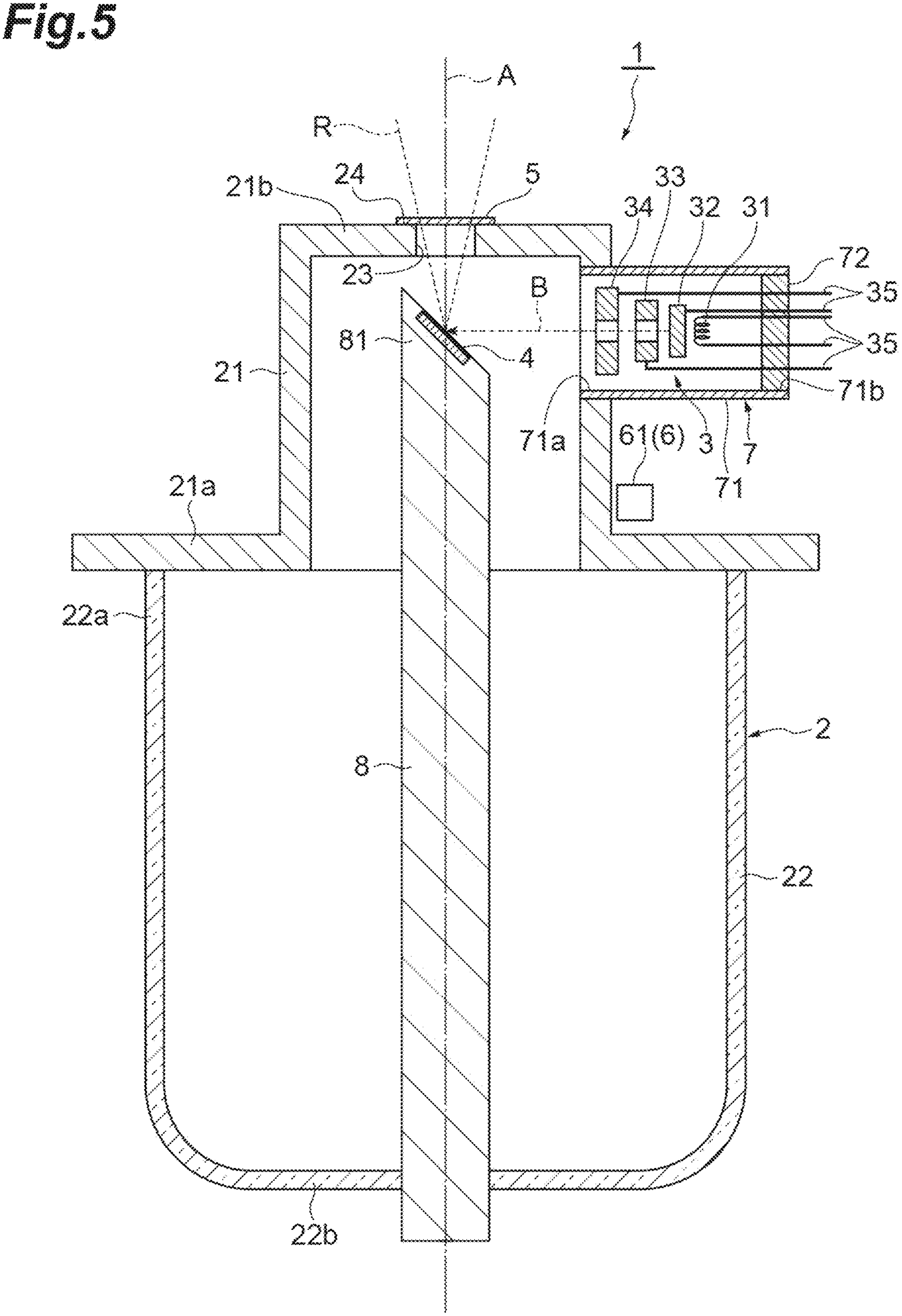
FIG. 5 is a cross-sectional view of an X-ray tube of a modification example.

The present disclosure is not limited to the embodiment. The X-ray tube 1 and the X-ray generation device 10 may be configured as a sealed reflection type. As illustrated in FIG. 5, the sealed reflection type X-ray tube 1 mainly differs from the sealed transmission type X-ray tube 1 in that the electron gun 3 is disposed inside an accommodation unit 7 on a lateral side of the head 21 and in that the target 4 is supported by a support member 8 instead of the window member 5. The accommodation unit 7 includes a lateral tube 71 and a stem 72. The lateral tube 71 is joined to a lateral wall portion of the head 21 such that one opening portion 71*a* of the lateral tube 71 faces the interior of the head 21. The stem 72 seals the other opening 71*b* of the lateral tube 71.

The heater 31, the cathode 32, the first grid electrode 33, and the second grid electrode 34 are disposed inside the lateral tube 71 in order from a stem 72 side. The plurality of lead pins 35 penetrate through the stem 72. The support member 8 penetrates through the bottom wall portion 22*b* of the valve 22. The target 4 is fixed to a tip portion 81 of the support member 8 in a state where the target 4 is inclined on the tube axis A to face both the electron gun 3 and the window member 5.

In this example, the deflection unit 6 is provided with respect to the lateral tube 71 of the accommodation unit 7. Accordingly, the permanent magnet 61 is disposed between the cathode 32 and the target 4 by a holding member 62. As a result, a magnetic field including at least a component perpendicular to a traveling direction of the electrons is formed between the cathode 32 and the target 4. In such a manner, here, the permanent magnet 61 also functions as a magnetic field-forming unit for deflecting the electrons by forming a magnetic field between the cathode 32 and the target 4.

Figure 6:
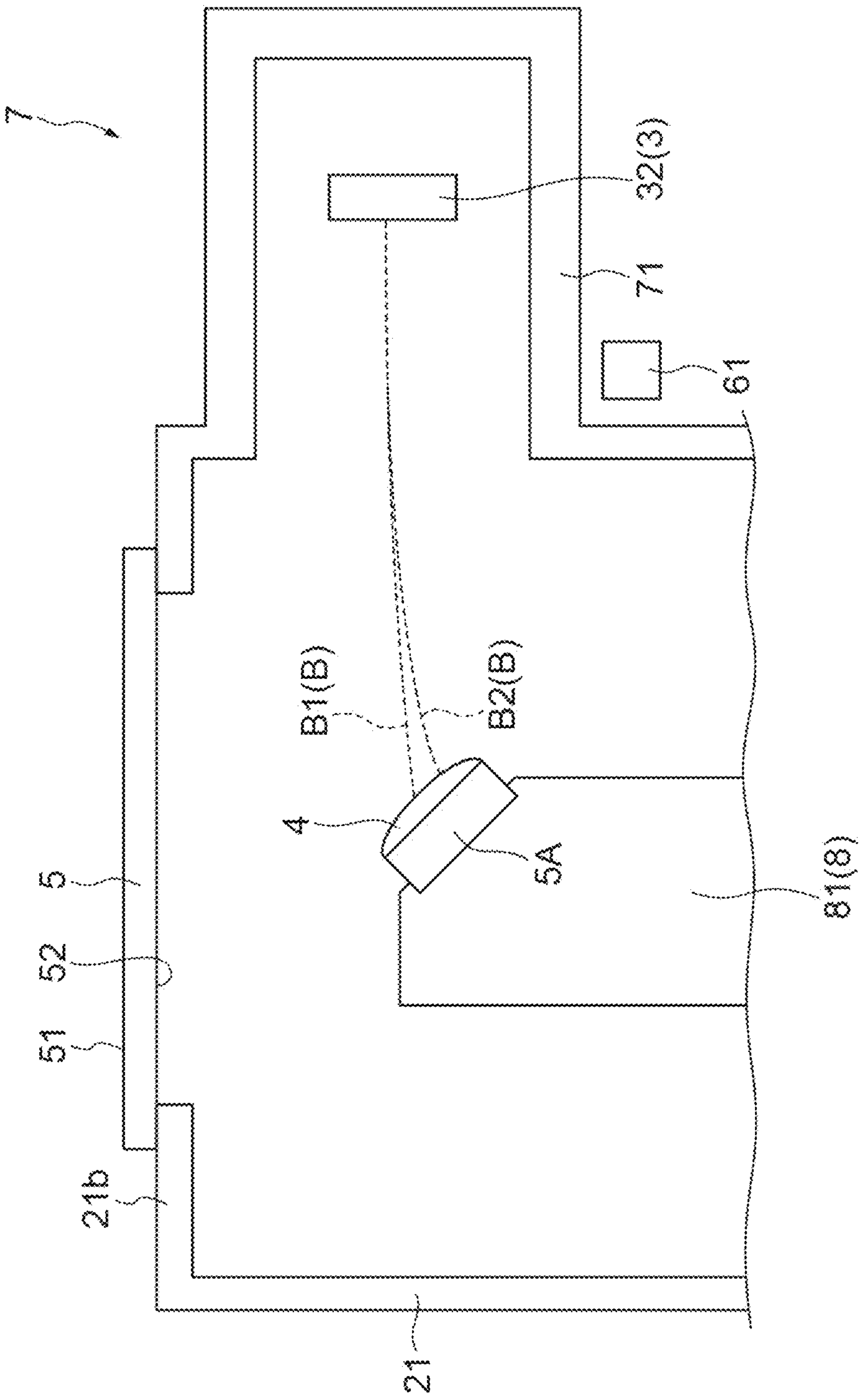
FIG. 6 is a schematic side view illustrating a part of FIG. 5 in an enlarged manner.

More specifically, as illustrated in FIG. 6, the permanent magnet 61 is disposed outside the lateral tube 71 of the accommodation unit 7. Therefore, the electrons emitted from the cathode 32 are deflected by receiving a force from the magnetic field formed by the permanent magnet 61, at least inside the lateral tube 71. Incidentally, in FIG. 6, the illustration of parts including the first grid electrode 33 and the second grid electrode 34 of the electron gun 3 is omitted.

In addition, the target 4 has a distribution in the thickness T4 similarly to the embodiment, and is disposed such that the electrons (electron beam B) are incident on a relatively thinner portion when the tube voltage is relatively low than when the tube voltage is relatively high.

In the X-ray generation device 10 including the sealed reflection type X-ray tube 1 configured as described above, as one example, in a state where the head 21 and the lateral tube 71 are set to the ground potential, a positive voltage is applied to the target 4 via the support member 8 by the power supply unit 11, and a negative voltage is applied to each part of the electron gun 3 via the plurality of lead pins 35 by the power supply unit 11. The electron beam B emitted from the electron gun 3 is focused onto the target 4 along a direction perpendicular to the tube axis A. The X-ray R generated in an irradiation region of the electron beam B on the target 4 is emitted to the outside by transmitting through the window member 5 with the irradiation region serving as the focal point. Furthermore, when the X-ray is generated by the electrons incident on the target 4, a majority of the incident energy is converted into heat. Therefore, when heat is accumulated in the target 4, the target 4 is thermally damaged, which is a risk. As a heat radiation measure, the support member 8 is made of a material with good thermal conductivity, for example, copper or the like, and the support body 5A is also made of a material with high thermal conductivity, for example, diamond or the like. Furthermore, in order to efficiently transfer heat generated inside the target 4, from the support body 5A to the support member 8, by causing the electron beam B to penetrate the target 4A so as to reach the vicinity of the boundary between the target 4A and the support body 5A, generated heat is easily transferred to the support body 5A, so that thermal damage to the target 4A can be suppressed. For this reason, control is performed such that the electron beam B is incident on a thick portion of the target 4 when a high tube voltage is applied to allow the electron beam B1 to penetrate deeply, and is incident on a thin portion of the target 4 when a low tube voltage is applied to allow the electron beam B2 to penetrate only to a shallow position, so that the electron beam B can be incident at an appropriate position on the target 4 and thermal damage to the target 4 can be suppressed.

Incidentally, the X-ray tube 1 may be configured as an open transmission type X-ray tube or an open reflection type X-ray tube. The open transmission type or open reflection type X-ray tube 1 is configured such that the housing 2 is openable, and is an X-ray tube of which components (for example, the window member 5 and each part of the electron gun 3) can be replaced. In the X-ray generation device 10 including the open transmission type or open reflection type X-ray tube 1, the degree of vacuum in the inner space of the housing 2 is increased by a vacuum pump.

In the sealed transmission type or open transmission type X-ray tube 1, the target 4 may be formed in at least a region of the second surface 52 of the window member 5, the region being exposed on the opening 23. In the sealed transmission type or open transmission type X-ray tube 1, the target 4 may be formed on the second surface 52 of the window member 5 with another film interposed therebetween.

In addition, in the above example, the permanent magnet 61 has been provided as an example of the magnetic field-forming unit. However, as the magnetic field-forming unit, any configuration (for example, an electromagnet such as a coil) capable of forming a magnetic field between the cathode 32 and the target 4 can be adopted. Regardless of which configuration of the magnetic field-forming unit is adopted, the electrons can be automatically incident at an appropriate position on the target 4 according to the tube voltage without controlling the formation (size) of a magnetic field, namely, while avoiding complicated control.

In addition, in the above example, one permanent magnet 61 has been provided as an example of the magnetic field-forming unit. However, the number of the permanent magnets 61 is not limited thereto, and a plurality of the permanent magnets 61 may be provided, and in that case, may be disposed to face each other.

Further, the distribution mode of the thickness T4 of the target 4 is any distribution mode as described above, and is not limited to the distribution in which the thickness T4 is set to become thinner from the central portion 4*a* toward the peripheral edge portion 4*b* as in the above example. For example, the distribution of the thickness T4 of the target 4 may be a distribution in which the thickness T4 monotonically becomes thinner from one end portion toward the other end portion. Even in this case, when the target 4 is disposed such that the electrons (electron beam B) are incident on a relatively thinner portion when the tube voltage is relatively low than when the tube voltage is relatively high, the same effects are achieved.

INDUSTRIAL APPLICABILITY

It is position to provide the X-ray generation device that enables the electron beam to be incident at an appropriate position on the target, while avoiding the complication of control.

REFERENCE SIGNS LIST

2: housing, 3: electron gun, 4: target, 5: window member, 10: X-ray generation device, 11: power supply unit (tube voltage application unit), 32: cathode (electron-emitting unit), 61: permanent magnet (magnetic field-forming unit).

The invention claimed is:

1. An X-ray generation device comprising:

a housing;

an electron gun including an electron-emitting unit configured to emit an electron inside the housing;

a target configured to generate an X-ray upon an incidence of the electron inside the housing;

a window member sealing an opening of the housing and configured to transmit the X-ray;

a tube voltage application unit configured to apply a tube voltage between the electron-emitting unit and the target; and a magnetic field-forming unit configured to deflect the electron by forming a magnetic field between the electron-emitting unit and the target, wherein a thickness of the target has a distribution, the target is disposed such that the electron is incident on a portion of the target which is relatively thinner in the thickness when the tube voltage is relatively low than when the tube voltage is relatively high, and the thickness of the target is set to become thinner from a central portion intersecting an axis of the electron gun toward a peripheral edge portion of the target, the target is disposed such that the electron is incident on a peripheral edge portion side as the tube voltage becomes relatively lower, and the magnetic field-forming unit forms a constant magnetic field including a component perpendicular to a traveling direction of the electrons.

2. The X-ray generation device according to claim 1, wherein the magnetic field-forming unit includes a permanent magnet.

3. The X-ray generation device according to claim 1, wherein the window member has a first surface opposite to an interior of the housing, and a second surface on an interior side of the housing, and the target is formed on the second surface.

4. The X-ray generation device according to claim 1, wherein the target is supported in a state where the target is inclined to face both the electron gun and the window member.

* * * * *